Figure 1:
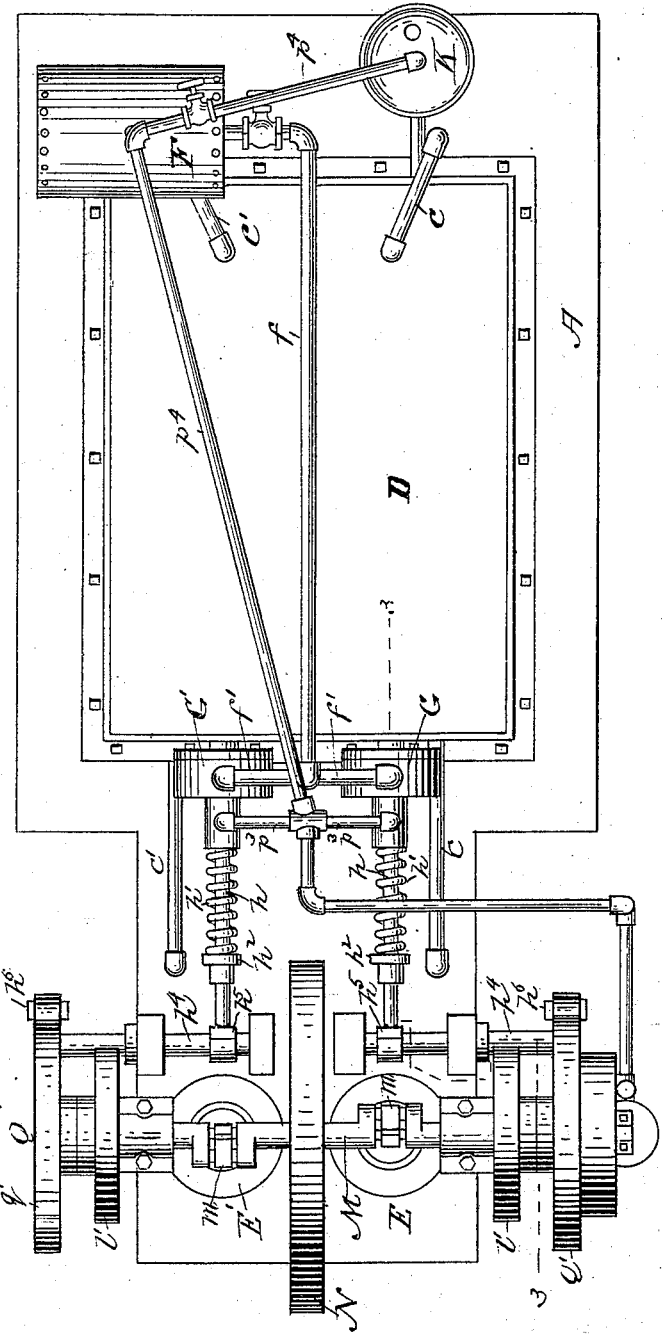

No. 663,084. Patented Dec. 4, 1900.
D. G. LANGLANDS.
STEAM GENERATOR.
(Application filed Mar. 29, 1900.)
(No Model.) 3 Sheets—Sheet 1.

WITNESSES
INVENTOR
Daniel Langlands

No. 663,084. Patented Dec. 4, 1900.
D. G. LANGLANDS.
STEAM GENERATOR.
(Application filed Mar. 29, 1900.)
(No Model.) 3 Sheets—Sheet 2.
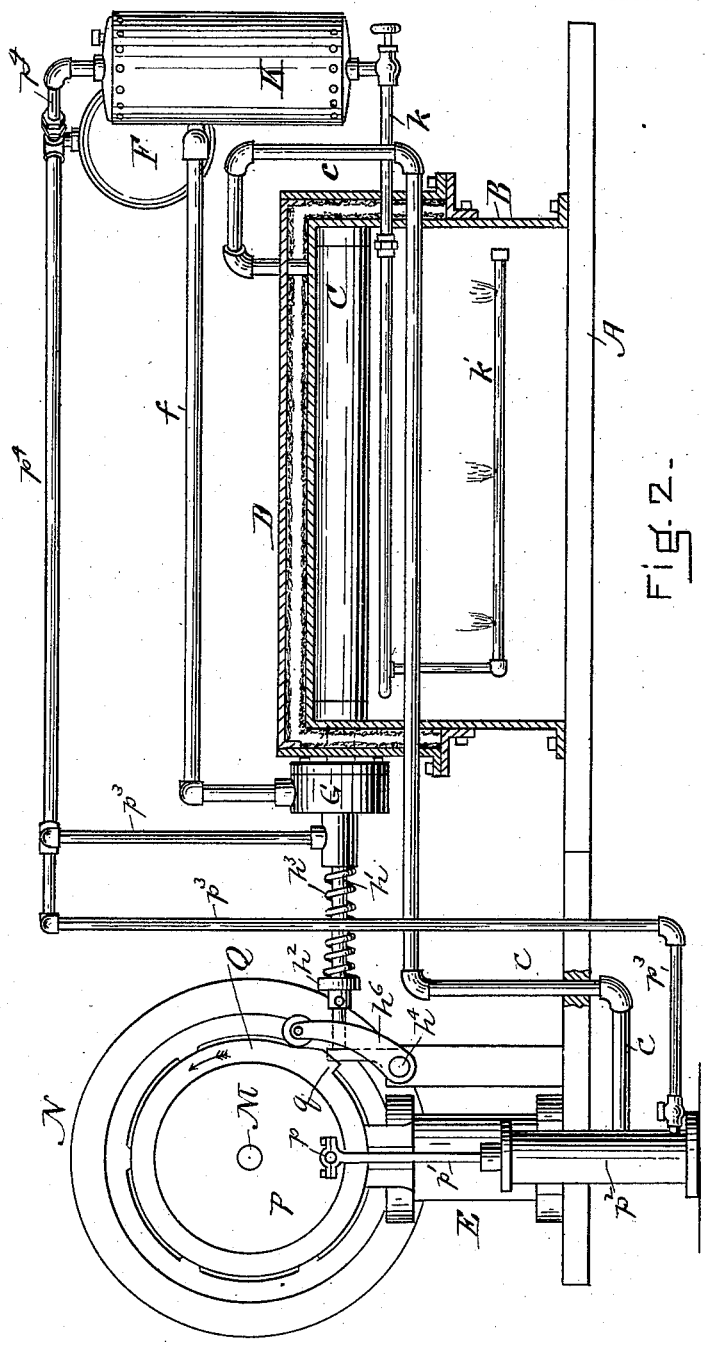
WITNESSES
INVENTOR No. 663,084. Patented Dec. 4, 1900.
D. G. LANGLANDS.
STEAM GENERATOR.
(Application filed Mar. 29, 1900.)
(No Model.) 3 Sheets—Sheet 3.
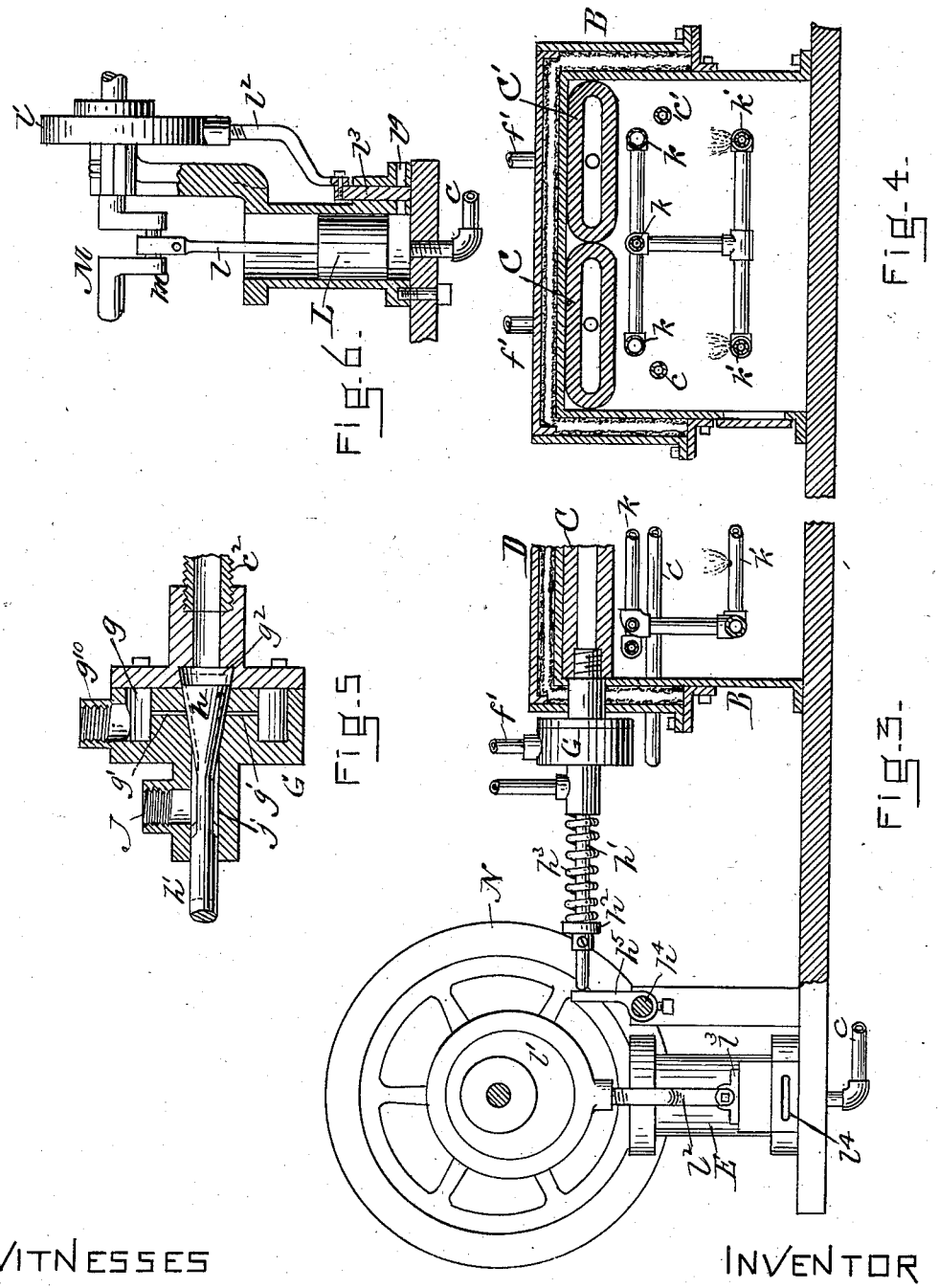
WITNESSES
INVENTOR

UNITED STATES PATENT OFFICE.

DANIEL G. LANGLANDS, OF NEWFIELDS, NEW HAMPSHIRE.

STEAM-GENERATOR.

SPECIFICATION forming part of Letters Patent No. 663,084, dated December 4, 1900.

Application filed March 29, 1900. Serial No. 10,659. (No model.)

*To all whom it may concern:*

Be it known that I, DANIEL G. LANGLANDS, of Newfields, in the county of Rockingham and State of New Hampshire, have invented a new and useful Improvement in Steam-Generators, of which the following is a full, clear, and exact description, reference being had to the accompanying drawings, forming a part of this specification, in explaining its nature.

My invention relates to that class of steam-generators in which only so much steam is generated at any one time as is necessary for the purpose of operating the engine and accomplishing the purpose for which the steam is needed—that is to say, it relates to a mechanism for generating steam under such conditions that no storage-chamber is either needed or desired and no boiler is necessary in the ordinary acceptation of the term, the steam being used immediately after its generation, and instead of shutting off steam from the engine or other place of use its generation itself is instantly stopped either by shutting off the supply of water or of fuel, or of both.

In obtaining power from steam generated in my apparatus I prefer to apply the steam to one side of the piston only, using a plurality of generators and a corresponding number of cylinders and connecting the said pistons by a crank-rod to the same shaft about which the crank-pins are located, so as to get continuous power. I have shown in the drawings two generators and two cylinders only, not intending to limit myself to that number, but to show a convenient form of apparatus embodying my invention.

My invention will be understood by reference to the drawings, in which—

Figure 1 is a plan of a generating apparatus connected to a steam-engine adapted for use therewith, Fig. 2 being a side elevation, the generator-casing being shown in section. Fig. 3 is a sectional view on the line 3 3 of Fig. 1, a portion only of the generator being shown. Fig. 4 is a cross-section of the generator and casing. Fig. 5 is a sectional detail, enlarged, showing the inlet into the steam-chamber and the valve which controls it; and Fig. 6 is a vertical section of the cylinder of the engine.

A is the base or floor, on which is mounted the casing B, surrounding the generating-chambers C C', having about its upper portion a jacket D. Between this jacket D and the casing B is an air-space, which is preferably lined with some non-conductor, such as asbestos, (indicated at $b$.)

The generating-chambers C C' are supported within the casing B and, as shown, are two in number, preferably elliptical in cross-section, so as to expose a comparatively large under surface to the fire, each chamber being connected by a pipe $c$ $c'$ with its own cylinder E E'.

F is a water-tank for supplying water from which to generate steam, it being connected by a feed-pipe $f$ with the inlet-casings G G' by means of suitable branch pipes $f'$.

The construction of the inlet-casings G G' will be understood from Fig. 5. The purpose of these casings is to provide means for spraying the water into the steam-chambers C C', and in the drawings are shown what now seems to me to be the best mechanism for accomplishing this purpose, the casing being located in one end of each of said chambers C C'. The casing is provided with an annular chamber $g$, having a coupling $g^{10}$ to receive the end of one of the branch pipes $f'$. This annular chamber $g$ is connected by small passages $g'$ with a conical outlet $g^2$, in which lies a conical valve $h$. The large end of this conical chamber is connected by a suitable opening with the coupling $c^2$, by means of which the casing is coupled to its steam-chamber C C'. The valve $h$ is reciprocated in the chamber $g^2$ by means to be described below, and this reciprocation alternately opens and closes the passages $g'$, connecting the annular chamber $g$ with the conical chamber $g^2$. In order that the water which is led to the casing G G' may be forced into the steam-chamber when the valve $h$ is open, I provide each casing with an air-inlet J, through which air may be forced into the passage $g^2$, and also provide a chamber $j$ in rear of the valve either by cutting away the valve-rod or enlarging the opening about it, as seems best. It will be seen that when the valve $h$ is in its forward position (shown in dotted line in Fig. 5) this air under pressure will rush from the chamber $j$ past the valve and will take up water from the passage $g'$ and spray it through the coupling $c^2$ into the steam-chambers C C'.

To provide heat by means of which to make steam from the jet of water so thrown, I prefer to use burning hydrocarbon vapor, and for this purpose I have shown an oil-tank K, which is connected by a pipe $k$ with a double set of burners $k'$, one set being located under each of the steam-chambers C C'. I prefer that this connection be made by carrying the pipe $k$ within the casing B and over the two sets of burners in order that the oil may be vaporized before being consumed. Any form of vapor-burner giving the requisite heat may be used with this device. There being many well known in the market, I do not specify any particular one. The steam as it is formed in the steam-chambers C C' is conveyed by means of steam-pipes $c\ c'$ to the cylinders E E'. For this purpose I prefer that the pipes $c\ c'$ shall enter their respective chambers C C' from above. Each pipe is carried down and through the casing B, so as to superheat the steam contained therein, and it enters its cylinder E E' from below, as shown in Fig. 6. Each cylinder is provided with a piston L, connected by the piston-rod $l$ with the crank-shaft M by the usual crank connection $m$, and in order that the steam may be exhausted from its cylinder an eccentric $l'$ is provided for each cylinder, the strap of which is connected by a connecting-rod $l^2$ with slide-valve $l^3$, set into a suitable frame on one side of the cylinder and adapted to control an opening $l^4$ in the lower side of the cylinder, each eccentric being so set upon the shaft M that as the piston rises, owing to the introduction of steam through the inlet-pipe $c\ c'$, the passage $l^4$ will be closed; but when the piston L reaches its highest position and during its descent the valve $l^3$ will be lifted by the eccentric to open the passage $l^4$ and allow the escape of steam. Any form of slide-valve mechanism would answer this purpose; but the above is a simple manner of obtaining the desired result.

It will be noted that no valve is shown between the inlet to the cylinder and the steam-chamber, and this is an important feature of my invention, the reduction or stopping of all pressure on the under side of the piston being caused in my engine by cutting off the spraying of water, so that no steam will be made. This is accomplished by shutting off the water from the inlets $g'$ by means of the valve $h$ at proper times. Various means may be adopted for accomplishing this purpose. I have shown a rocker-arm and cam mechanism which seems to me well adapted to the purpose and which will now be described, this mechanism being duplicated for each casing. The valve-rod $h'$ carries a collar $h^2$, between which and the rear end of the casing G G' there is a spiral expanding spring $h^3$, which tends to keep the valve closed in the chamber $g^2$, thereby preventing the passage of water through the inlets $g'$ and passage of air from the inlet J.

$h^4$ is a rock-shaft carrying a rocker-arm $h^5$, located in the rear of and in engagement with the rear end of the valve-rod $h'$. This rock-shaft $h^4$ carries another rocker-arm $h^6$, on the end of which is a cam-roll adapted to engage with its cam Q Q' on the shaft M. Such cam has a projecting cam-surface $q\ q'$. As the cam Q Q' rotates in the direction of the arrow, Fig. 2, the cam-roll on the arm $h^6$ rides on the projection $q\ q'$ and oscillates the rock-shaft, causing the rocker-arm $h^5$ to push in the valve-rod $h'$ and the valve $h$ to open a clear passage for air from the coupling J and water from the inlet $g'$.

It will be noticed that there are two steam generators or chambers C C', each connected with its own cylinder E E', and it will be seen from Fig. 1 that the cranks $m\ m'$, connecting the pistons L with the crank-shaft M, are set opposite each other, as are the cam-surfaces $q\ q'$. By this means the generation of steam alternates in each chamber, and power is thereby constantly furnished to the shaft M, one of the cylinders E E' receiving steam while the other is exhausting.

Upon the shaft M is a balance-wheel N, and at one end of the shaft is a crank-disk or pulley-wheel P, carrying a crank-pin $p$, by means of which and the connecting-rod $p'$ the plunger in the air-pump $p^2$ is operated. This air-pump is connected by the pipe $p^3$ and suitable connections with the air-inlets J in the casings G G', and it is also connected by the pipe $p^4$ with the tanks F and K to provide air-pressure to force the water in the tank F to the casings G G' and the oil in the tank K to the burners $k'$. Any other form of air-supply under pressure may be adopted, and the application of air-pressure to the water and oil tanks is not necessary if they are located sufficiently high above the generator.

The various air, water, and oil pipes are provided with suitable cocks, by means of which the supply of air, water, and oil may be regulated or shut off at will.

My apparatus is simple and economical of construction and especially economical in use, for as steam is only made when the engine is needed there is no waste when the engine is out of use.

It is evident that the form of water-jet shown is not essential to the embodiment of my invention, which does not relate especially to the means for introducing water, but to its intermittent introduction, whereby it is introduced only when steam is needed.

By the use of my apparatus, as above described, steam is applied to a piston as its impulse and without stored pressure, by which I mean that the explosion of the spray of water into steam exerts itself directly upon the piston. It is apparent that this will be the result even if, for example, a low-pressure check-valve were placed between the generator and the cylinder. There would be no advantage in using such check-valve that I can now see, nor would there be any disadvantage so long as such a valve offered no material obstacle to the conveyance of pressure from the generator to the cylinder, as above referred to.

Having thus fully described my invention, I claim and desire to secure by Letters Patent of the United States—

1. In a steam-generator, a generator-chamber having a valveless outlet and a water-spraying device adapted to deliver water into said chamber in the form of spray, an intermittently-operating valve located to control the operation of said water-spraying device and means whereby said valve is intermittently operated, as set forth.

2. In a steam-generator, a generator-chamber having a valveless outlet and means for spraying water located to deliver spray into said chamber, an intermittently-operating valve located to control the passage of water to said water-spraying means, means for operating said valve, and means for heating said chamber, as set forth.

3. In a steam-generator, a generator-chamber, means for heating said chamber and means for intermittently supplying water thereto in the form of spray, said means consisting of a chamber having a water-inlet and an air-inlet and an outlet leading to said generator-chamber and common to both air and water, and a valve adapted to close said outlet and means whereby it is operated intermittently, all arranged together and adapted for the purposes set forth.

4. As a means for generating and applying power in combination a generator-chamber and means for heating it, a water-spraying device located to spray water into said chamber, means for intermittently feeding water thereto, an engine cylinder and piston and a valveless pipe connecting said chamber with said cylinder whereby separate charges of water are sprayed into said chamber, flashed into steam and immediately pass to said cylinder and into contact with said piston, as set forth.

5. As a means for generating and applying power two or more generator-chambers each provided with means for heating it and having a valveless outlet adapted to be connected directly to an engine-cylinder, each chamber being also provided with an inlet and means whereby water may be sprayed therethrough, and a valve controlling said inlet, in combination with means for operating said valves intermittently whereby water may be sprayed into each chamber alternately and the steam from each chamber alternately led to an engine-cylinder as set forth.

6. As a means for generating and applying power, a steam-generator consisting of two generator-chambers and means for heating them, each generator-chamber having a valveless outlet adapted to be connected to an engine-cylinder, each chamber being also provided with an inlet and means for spraying water therethrough, a valve controlling said inlet and means for reciprocating said valve intermittently, and each valve in an opposite direction to that in which the other is moving in combination with one or more engine-cylinders each provided with a piston and a suitable exhaust whereby the steam made alternately in each chamber is led directly and without the intervention of any valve to one side of a piston and having there exerted its force is exhausted therefrom, all as set forth.

7. In a steam-generator in combination with a generator-chamber a water-spraying device located and adapted to spray water intermittently into said chamber, and consisting of a conical chamber a conical valve adapted to reciprocate therein to open and close the passage to said generator-chamber, and means whereby said valve is reciprocated, and a water-inlet and an air-inlet both leading into said conical chamber, as and for the purposes set forth.

DANIEL G. LANGLANDS.

Witnesses:
GEORGE O. G. COALE,
M. E. FLAHERTY.